March 27, 1951 — W. S. YOUNG — 2,546,577
MEAT BLOCK SCRAPER
Filed Dec. 4, 1947
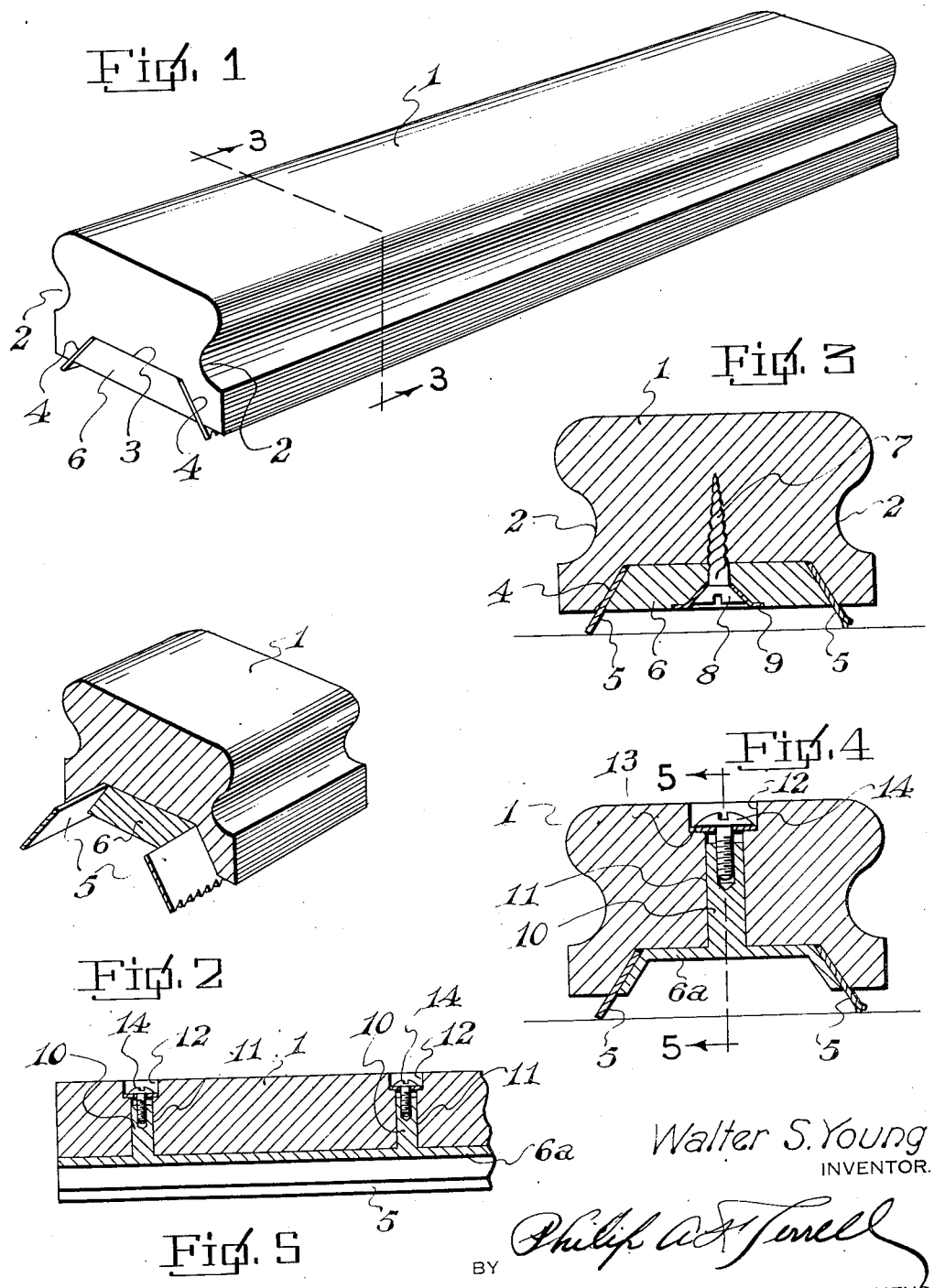
Walter S. Young
INVENTOR.
BY Philip A. Terrell
ATTORNEYS.

Patented Mar. 27, 1951

2,546,577

UNITED STATES PATENT OFFICE 2,546,577

MEAT BLOCK SCRAPER

Walter S. Young, Tulsa, Okla.

Application December 4, 1947, Serial No. 789,578

1 Claim. (Cl. 15—236)

The invention relates to meat block scrapers and levelers, and has for its object to provide a device of this kind comprising an elongated handle member having a longitudinal channel in the under side thereof, and means for clamping downwardly diverging scraper blades in opposite sides of the channel.

A further object is to provide a wedging strip within the channel and held in position by screws cooperating with the body member for securely clamping the scraping elements against the side walls of the channel.

A further object is to provide the clamping member with integral upwardly extending members receivable in apertures in the body member and screws threaded into the extension, and cooperating with portions of the body member so the clamping member may be forced into binding engagement with the scraping elements.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a perspective view of the scraper and leveler.

Figure 2 is a vertical transverse sectional view showing the dual scraper elements.

Figure 3 is a vertical transverse sectional view taken on line 3—3 of Figure 1.

Figure 4 is a vertical transverse sectional view through a modified form of scraper.

Figure 5 is a vertical longitudinal sectional view through the modified form and taken on line 5—5 of Figure 4.

Referring to the drawing, the numeral 1 designates the elongated handle member, opposite sides of which handle are grooved at 2, so the handle can be grasped by both hands of the operator for imparting reciprocation to the tool, or a rotary movement during a scraping or planing operation.

The device is described as a meat block scraper or planer, however it is understood it may be used for general scraping purposes.

The underside of the handle member 1 is provided with a longitudinally extending channel 3, the opposite sides of which channel incline downwardly and outwardly, as at 4, and preferably at a thirty degree angle to the vertical, to obtain the maximum scraping efficiency, and clamped against the surfaces 4 are scraping elements 5, which may be hack saw blades or straight scraping elements.

The blades 5 are clamped against the inclined surfaces 4 by a longitudinally extending wedging strip 6, the sides of which conform to the angles of the blades, and the wedging strip is held in position by means of screws 7, which screws have their heads 8 in metallic ferrules 9, therefore it will be seen that the blades will be rigidly held at all times to stand a reciprocating motion of the tool as a whole, and also a rotary motion. Any number of screws 7 may be used.

Referring to the modified form shown in Figures 4 and 5, the operation is the same but the clamping member 6a is formed from metal and is provided with spaced integral upwardly extending shafts 10, which shafts are received in vertical apertures 11 in the handle member 1, and terminate adjacent the bottom of the counterbores 12. Disposed within the counterbores 12, and on washers 13, are screws 14, adapted to receive a screw driver for controlling the clamping and unclamping operation of the scraper blades 5.

From the above it will be seen that a scraping and planing tool is provided which is simple in construction, the parts reduced to a minimum, and one wherein the blades are positively held and can be renewed from time to time without entirely disassembling the tool.

The invention having been set forth, what is claimed as new and useful is:

A scraping tool comprising an elongated handle member, said handle member having its under side provided with a channel, opposite sides of said channel diverging downwardly and outwardly, a clamping member within the channel and conforming to the shape of the handle member channel, said clamping member comprising a plate, opposite sides of said plate being formed with downwardly diverging flanges, said clamping member having spaced upwardly extending integral studs extending through apertures in the handle member, and headed screws disposed in counter-bores in the handle member above the apertures and threaded into the upwardly extending studs.

WALTER S. YOUNG.

REFERENCES CITED

The following references are of record in the file of this patent:

UNITED STATES PATENTS

| Number | Name | Date |
|---|---|---|
| 586,164 | Denere | July 13, 1897 |

FOREIGN PATENTS

| Number | Country | Date |
|---|---|---|
| 225,172 | Germany | Aug. 19, 1910 |
| 385,688 | Germany | Dec. 11, 1923 |